United States Patent
Itoh et al.

(10) Patent No.: US 7,121,103 B2
(45) Date of Patent: Oct. 17, 2006

(54) VEHICLE AIR CONDITIONING SYSTEM

(75) Inventors: Satoshi Itoh, Kariya (JP); Toshinobu Homan, Kariya (JP); Keiichi Kitamura, Kariya (JP)

(73) Assignee: Denso Corporation, Kariya (JP)

( * ) Notice: Subject to any disclaimer, the term of this patent is extended or adjusted under 35 U.S.C. 154(b) by 400 days.

(21) Appl. No.: 10/690,262

(22) Filed: Oct. 21, 2003

(65) Prior Publication Data

US 2004/0079096 A1    Apr. 29, 2004

(30) Foreign Application Priority Data

Oct. 25, 2002    (JP)    ............................. 2002-310965

(51) Int. Cl.
F25B 29/00    (2006.01)
F25B 41/04    (2006.01)
(52) U.S. Cl. .............................. 62/173; 62/205; 62/223
(58) Field of Classification Search ................... 62/173, 62/205, 223
See application file for complete search history.

(56) References Cited

U.S. PATENT DOCUMENTS

| 5,526,650 | A | | 6/1996 | Iritani et al. |
| 5,701,753 | A | * | 12/1997 | Iritani ........................... 62/211 |
| 6,035,653 | A | * | 3/2000 | Itoh et al. ................... 62/228.4 |
| 6,053,000 | A | * | 4/2000 | Levitin et al. ................ 62/205 |
| 6,138,467 | A | * | 10/2000 | Lifson et al. ................. 62/217 |
| 6,272,870 | B1 | * | 8/2001 | Schaeffer ..................... 62/205 |
| 6,314,750 | B1 | * | 11/2001 | Ishikawa et al. ........... 62/324.1 |
| 2001/0027657 | A1 | * | 10/2001 | Yamasaki et al. ............. 62/222 |
| 2002/0023451 | A1 | * | 2/2002 | Kuroda et al. ............. 62/228.4 |
| 2002/0162342 | A1 | * | 11/2002 | Weng et al. .................. 62/156 |

* cited by examiner

*Primary Examiner*—Cheryl Tyler
*Assistant Examiner*—B. Clayton McCraw
(74) *Attorney, Agent, or Firm*—Harness, Dickey & Pierce, PLC

(57) ABSTRACT

An automobile air conditioning system controls the high pressure of the refrigeration cycle in a wide range of airflows from a low airflow region during an intermediate period to a high airflow region. When a dehumidifying mode is selected, the target high pressure at which the cycle efficiency calculated from a gas cooler outlet refrigerant temperature is maximized is defined as a target value to a valve such as a heating variable throttle valve to control the high pressure of the refrigeration cycle to the target value. This permits control such that the cycle efficiency of the refrigeration cycle is maximized in a wide range of airflow from a low airflow region during an intermediate period to a high airflow region at a relatively low, about 10° C., outside air temperature.

16 Claims, 6 Drawing Sheets

VEHICLE AIR CONDITIONING SYSTEM

CROSS REFERENCE TO RELATED APPLICATIONS

This application is based upon, claims the benefit of priority of, and incorporates by reference, the contents of Japanese Patent Application No. 2002-310965 filed Oct. 25, 2002.

BACKGROUND OF THE INVENTION

1. Field of the Invention

The present invention relates to a vehicle air conditioning system in which the operation mode of a refrigeration cycle is set to any one of several operation modes, i.e., a cooling mode, a heating mode, or a dehumidifying mode, in accordance with a target blowing temperature set by at least the temperature deviation between a set point temperature and an inside air temperature.

2. Description of the Related Art

Vehicle air conditioning systems are known in which an evaporator serving as a cooling heat exchanger for cooling air and a condenser serving as a heating heat exchanger for heating air are disposed inside an air duct with an external heat exchanger disposed externally to the air duct and coupled between the condenser and the evaporator. The vehicle air conditioning system is designed such that selecting a dehumidifying mode as an operation mode of the refrigeration cycle (heat pump cycle) will cause a refrigerant discharged from a discharge outlet of a compressor (refrigerant compressor) to circulate along a path from the condenser through a heating electronic expansion valve (a first variable throttle valve), an external heat exchanger, a cooling electronic expansion valve (a second variable throttle valve), an evaporator, and an accumulator to a compressor.

The combination of the degrees of opening of the heating and cooling electronic expansion valves during a dehumidifying mode are corrected according to five types of opening patterns that are set in accordance with a condenser outlet air temperature indicative of information regarding the blowing temperature of conditioned air blown through the air duct into a passenger compartment. In a dehumidifying mode, this allows for reducing the temperature deviation between an actual blowing temperature of conditioned air blown through the air duct into the passenger compartment and the target blowing temperature, resulting in improved control characteristics of the blowing temperature (e.g., see Japanese Patent Laid-Open Publication No. Hei 8-40056 (1996), essentially pages 9 to 11, FIGS. 11 to 16).

However, in the Hei 8-40056 vehicle air conditioning system, the degree of opening of the heating and cooling electronic expansion valves is varied in accordance with the condenser outlet air temperature indicative of information regarding the blowing temperature of conditioned air blown into the passenger compartment through the air duct. Thus, the degrees of opening of the heating and cooling electronic expansion valves are not corrected so as to control the cycle efficiency of the refrigeration cycle. Accordingly, in a wide range of airflow from a low airflow region during an intermediate period to a high airflow region at a relatively low outside air temperature (at about 10° C. of outside air), it was not possible to control the heat application capacity (heating capacity) of a heating heat exchanger and the cooling capacity (dehumidifying capacity) of a cooling heat exchanger to a target value while providing control to the cycle efficiency of the refrigeration cycle.

It is therefore an object of the present invention to provide a vehicle air conditioning system that enables the cycle efficiency of a refrigeration cycle to be controlled in a wide range of airflow from a low airflow region during an intermediate period to a high airflow region. It is also an object of the present invention to provide a vehicle air conditioning system which can control the heat application capacity (heating capacity) of a heating heat exchanger and the cooling capacity (dehumidifying capacity) of a cooling heat exchanger to a target value, while controlling the cycle efficiency of the refrigeration cycle, in a wide range of airflows from a low airflow region during an intermediate period to a high airflow region.

SUMMARY OF THE INVENTION

The present invention relates to a vehicle air conditioning system that employs carbon dioxide as a refrigerant and comprises a supercritical vapor compressive heat pump cycle for discharging the refrigerant from a refrigerant compressor at a high pressure that is greater than or equal to the critical pressure of the refrigerant.

According to a first aspect of the present invention, when the dehumidifying mode has been selected as the operation mode of the refrigeration cycle, the degree of opening of any one of the first variable throttle valve and the second variable throttle valve is controlled in accordance with the deviation between the target cycle efficiency. The target cycle efficiency is set by the cycle efficiency determination means and the current cycle efficiency sensed by the cycle efficiency sensing means, thereby making it possible to control the cycle efficiency of the refrigeration cycle in a wide range of airflow from a low airflow region during an intermediate period to a high airflow region.

According to a second aspect of the present invention, the refrigerant compressor makes use of the motor-driven refrigerant compressor that is rotatably driven by a drive motor, thereby making it possible to cool, heat, or dehumidify the passenger compartment of a motor vehicle, such as an electric car having no engine cooling water or a car with an air-cooled engine. Furthermore, the drive motor for rotatably driving the refrigerant compressor is controllably activated by an inverter serving as a drive power supply, thereby making it possible to easily and quickly change the amount of discharge of the refrigerant discharged from the refrigerant compressor, i.e., the heat application capacity (heating capacity) of a heating heat exchanger and the heat removal capacity (cooling capacity) or the dehumidifying capacity of a cooling heat exchanger. Additionally, only the rotational speed of the refrigerant compressor can be changed. This change allows the outlet air temperature of the cooling heat exchanger to be generally consistent with the target value, the outlet air temperature of the heating heat exchanger to be generally consistent with the target value, and the blowing temperature of conditioned air blown into the passenger compartment of a motor vehicle also to be generally consistent with the target blowing temperature.

According to a third aspect of the present invention, the degree of opening of any one of the first variable throttle valve and the second variable throttle valve is controlled in accordance with the pressure deviation between the current high pressure sensed by the high-pressure sensing means and the target high pressure set by the first high-pressure determination means, thereby making it possible to control the cycle efficiency of the refrigeration cycle in a wide range of airflow from a low airflow region during an intermediate period to a high airflow region.

According to a fourth aspect of the present invention, when a capacity overload on the heating heat exchanger is sensed by the capacity overload sensing means, the degree of opening of any one of the first variable throttle valve and the second variable throttle valve is controlled in accordance with the pressure deviation between the current high pressure sensed by the high-pressure sensing means and the target high pressure set by the second high-pressure determination means. This allows the external heat exchanger to be switched from a heat absorber to a heat radiator. This causes the load on the heating heat exchanger to be reduced and the temperature of conditioned air blown into the passenger compartment through the air duct to be decreased as well as the refrigeration cycle to be balanced. Furthermore, since the high pressure of the refrigeration cycle is also reduced, the mechanical and electrical power of the refrigerant compressor can be further saved when compared with the refrigerant temperature at the outlet of the heating heat exchanger that is permitted to control the high pressure.

According to a fifth aspect of the present invention, it is determined that the heating heat exchanger is overloaded when the deviation between the current heating capacity sensed by the heating capacity sensing means and the target heating capacity set by the heating capacity determination means is greater than or equal to a certain value and when a dehumidifying operation condition is satisfied in which the rotational speed of the refrigerant compressor sensed by the rotational speed sensing means is greater than or equal to a certain value. This makes it possible to distinguish between the cases where the heating heat exchanger is overloaded temporarily due to a change in set point temperature or the like and where the heating heat exchanger is constantly overloaded.

According to a sixth aspect of the present invention, the dehumidifying mode can be selected as the operation mode of the refrigeration cycle when the target blowing temperature set by the blowing temperature determination means is within a predetermined range or when the dehumidifying or defogging switch is in an ON state, there by dehumidifying the passenger compartment. Thus, this allows for defogging a glass window or preventing glass window fogging. At this time, with the heating heat exchanger being disposed downstream of the cooling heat exchanger in the direction of airflow, the air having passed through the cooling heat exchanger can be re-heated at the heating heat exchanger, thereby performing a dehumidifying heating operation by which the passenger compartment is heated while being dehumidified.

According to a seventh aspect of the present invention, in the dehumidifying mode, when the dehumidifying priority mode is requested by the dehumidifying mode setting means, the rotational speed of the refrigerant compressor can be controlled in accordance with the deviation between the current dehumidifying capacity sensed by the dehumidifying capacity sensing means and the target dehumidifying capacity set by the dehumidifying capacity determination means to control the cooling capacity (the dehumidifying capacity) of the cooling heat exchanger to an optimum value, thereby providing an improved dehumidifying capacity for the passenger compartment. Furthermore, the rotational speed of the refrigerant compressor is controlled not to control the heating capacity of the heating heat exchanger but to control the dehumidifying capacity of the cooling heat exchanger. This is because the control over the rotational speed of the refrigerant compressor allows the dehumidifying capacity of the cooling heat exchanger to reach the target dehumidifying capacity in a shorter time than the control provided by the variable throttle valve.

Furthermore, the degree of opening of any other of the first variable throttle valve and the second variable throttle valve can be controlled in accordance with the deviation between the current heating capacity sensed by the heating capacity sensing means and the target heating capacity set by the heating capacity determination means to control the heat application capacity (heating capacity) of the heating heat exchanger to an optimum value. This allows for providing an improved heating capacity for the passenger compartment without causing a decrease in the blowing temperature of conditioned air blown from the air duct. Therefore, it is possible to control the heat application capacity (heating capacity) of the heating heat exchanger and the cooling capacity (the dehumidifying capacity) of the cooling heat exchanger to a target value, while controlling the cycle efficiency of the refrigeration cycle, in a wide range of airflow from a low airflow region during an intermediate period to a high airflow region.

According to an eighth aspect of the present invention, in the dehumidifying mode, when the blowing temperature priority mode is requested by the dehumidifying mode setting means, the rotational speed of the refrigerant compressor can be controlled in accordance with the deviation between the current heating capacity sensed by the heating capacity sensing means and the target heating capacity set by the heating capacity determination means to control the heat application capacity (heating capacity) of the heating heat exchanger to an optimum value. This provides an improved heating capacity for the passenger compartment without causing a decrease in the blowing temperature of conditioned air blown out of the air duct.

On the other hand, the rotational speed of the refrigerant compressor is controlled not to control the dehumidifying capacity of the cooling heat exchanger but to control the heating capacity of the heating heat exchanger, i.e., the blowing temperature of conditioned air blown from the air duct. This is because the control over the rotational speed of the refrigerant compressor allows the heating capacity of the heating heat exchanger to reach the target heating capacity in a shorter time than the control provided by the variable throttle valve.

Furthermore, the degree of opening of any other of the first variable throttle valve and the second variable throttle valve can be controlled in accordance with the deviation between the current dehumidifying capacity sensed by the dehumidifying capacity sensing means and the target dehumidifying capacity set by the dehumidifying capacity determination means to control the cooling capacity (the dehumidifying capacity) of the cooling heat exchanger to an optimum value. This allows for providing an improved dehumidifying capacity for the passenger compartment. Therefore, it is possible to control the heat application capacity (heating capacity) of the heating heat exchanger and the cooling capacity (dehumidifying capacity) of the cooling heat exchanger to a target value while controlling the cycle efficiency of the refrigeration cycle in a wide range of airflow from a low airflow region during an intermediate period to a high airflow region.

According to a ninth aspect of the present invention, the dehumidifying priority mode can be selected to provide a higher priority to the dehumidifying priority mode than to the blowing temperature priority mode when the air conditioner switch is in an ON state or when the dehumidifying or defogging switch is in an ON state. On the other hand, the blowing temperature priority mode can be selected to provide a higher priority to the blowing temperature priority mode than to the dehumidifying priority mode when the dehumidifying or defogging switch is in an OFF state and when the air conditioner switch is in an OFF state. Additionally, according to a tenth aspect of the present invention, the blowing temperature priority mode can be selected to provide a higher priority to the blowing temperature priority mode than to the dehumidifying priority mode when the operation mode setting means changes the operation mode of the refrigeration cycle from a heating mode to a dehumidifying mode.

According to an eleventh aspect of the present invention, the refrigeration cycle employs carbon dioxide as a refrigerant, and the supercritical vapor compressive heat pump cycle in which the refrigerant is discharged from the refrigerant compressor is at a pressure greater than or equal to the critical pressure of the refrigerant. Furthermore, the cooling heat exchanger for cooling air flowing through the air duct and the heating heat exchanger for re-heating the air having passed through the cooling heat exchanger are disposed within the air duct, there by making it possible to make the discharge temperature of the refrigerant discharged from the refrigerant compressor greater than or equal to a predetermined value. This in turn allows the blowing temperature of conditioned air blown into the passenger compartment through the air duct to be made greater than or equal to a predetermined value.

As any one of the first variable throttle valve and the second variable throttle valve, it is preferable to employ the first variable throttle valve (e.g., a heating expansion valve) which enables control over the high pressure of the refrigeration cycle. As any other of the first variable throttle valve and the second variable throttle valve, it is preferable to employ the second variable throttle valve (e.g., a cooling expansion valve) which enables control over the temperature of air immediately downstream of the cooling heat exchanger (e.g., the after-evaporator temperature) or the temperature of air immediately downstream of the heating heat exchanger (e.g., the after-gas-cooler temperature or the blowing temperature). With a receiver cycle being employed here as the refrigeration cycle, the temperature (the evaporation temperature of the refrigeration cycle) of the refrigerant at the outlet of the cooling heat exchanger serving as a refrigerant evaporator (evaporator) can be controlled by means of the degree of opening of the second variable throttle valve (the cooling expansion valve), thereby controlling the cycle efficiency of the refrigeration cycle.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

(First Embodiment)

Figure 1:
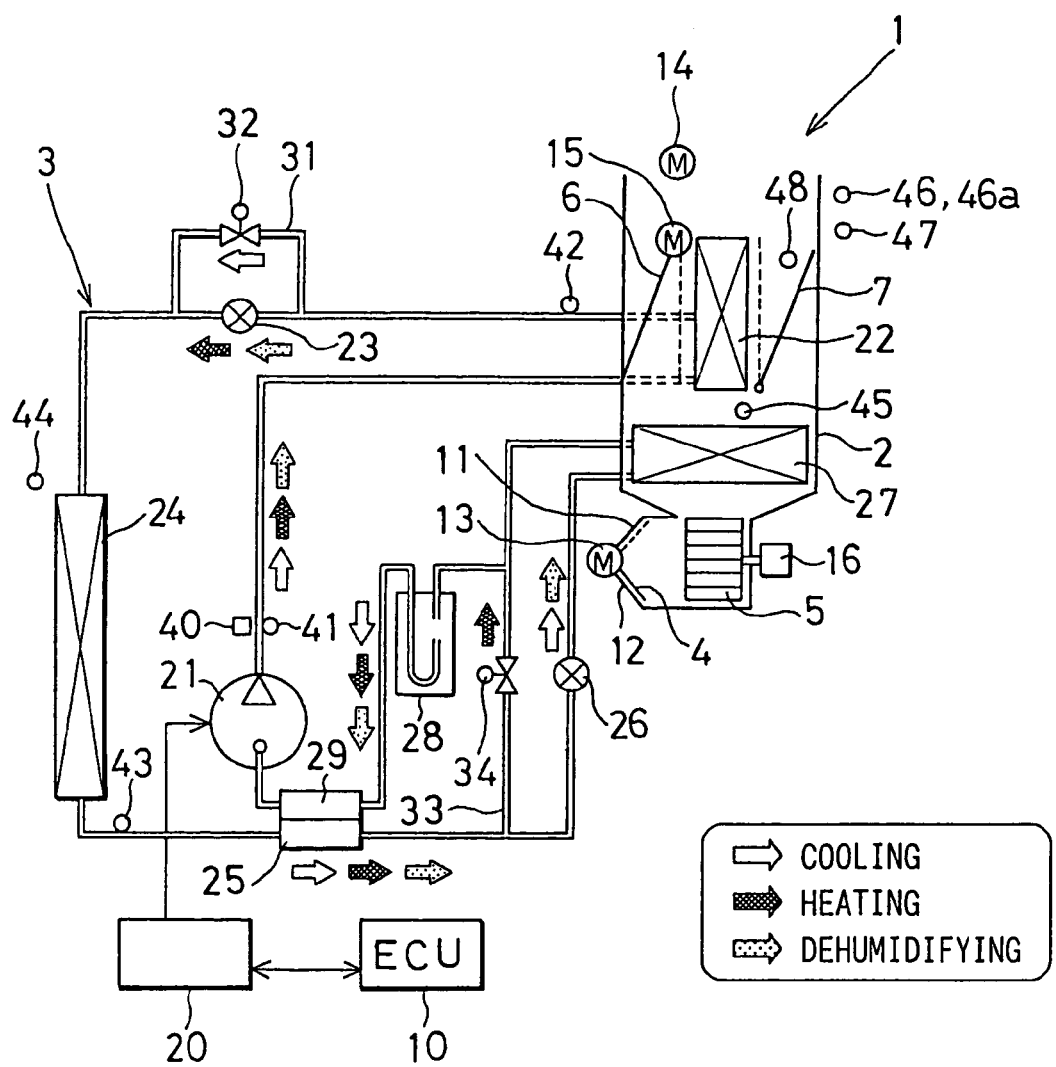
FIG. 1 is a schematic view showing the configuration of a vehicle air conditioning system according to a first embodiment of the present invention.
Figure 2:
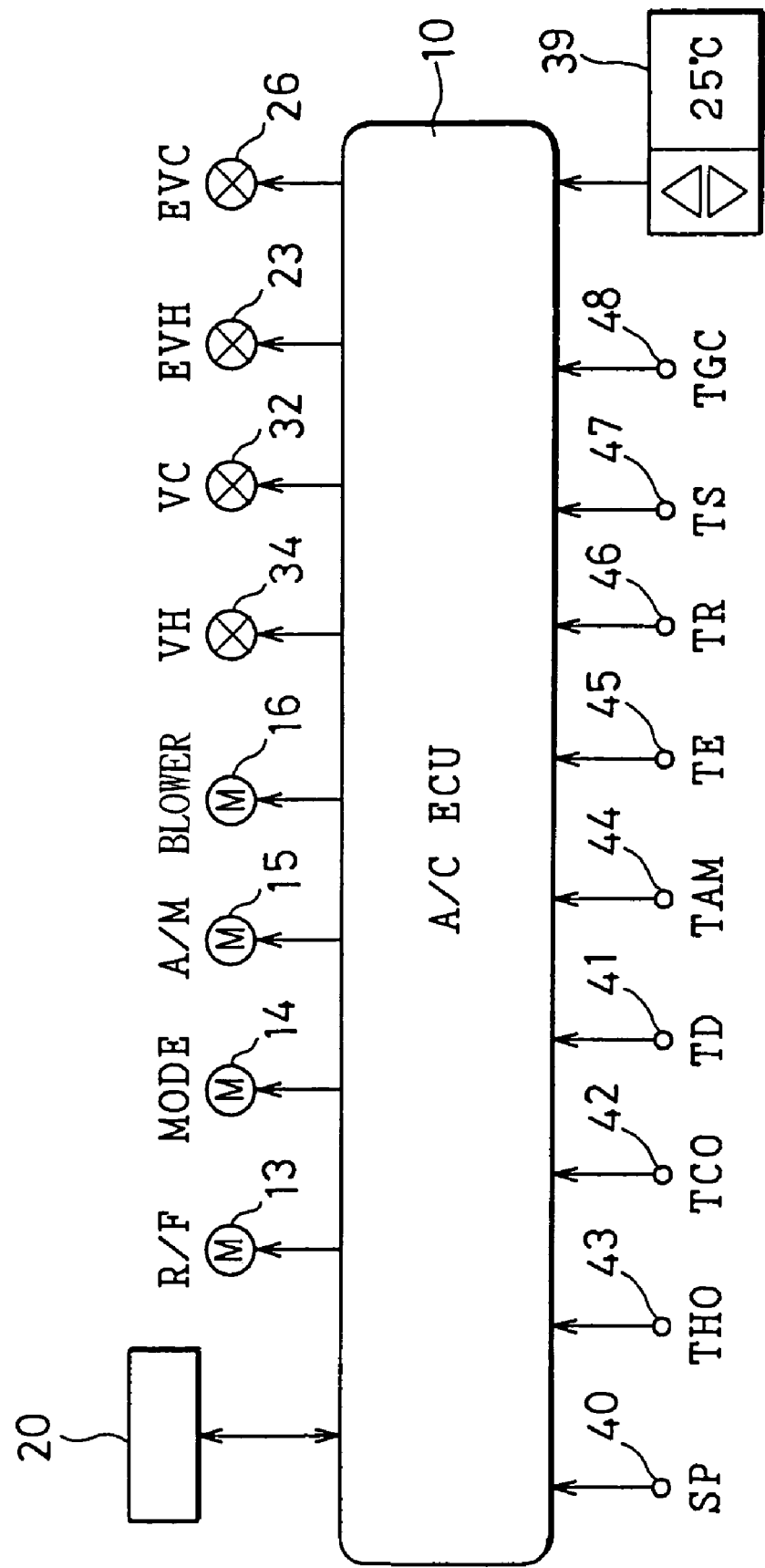
FIG. 2 is a block diagram showing an air conditioning controller according to the first embodiment of the present invention.

FIGS. 1 to 7 show a first embodiment of the present invention. FIG. 1 shows the configuration of an automobile air conditioning system, FIG. 2 shows an air conditioning controller of the automobile air conditioning system.

The automobile air conditioning system according to this embodiment is an automobile automatic air conditioner which allows an air conditioning controller, that is, an air conditioner controller, hereinafter referred to as the ECU 10, to control each air conditioning device (actuators) in an air conditioning unit (air conditioner unit) 1 for conditioning the air in the passenger compartment 46a of a vehicle such as an automobile. The air conditioning unit 1 includes an air duct 2 which defines therein an air passageway for introducing conditioned air into the passenger compartment 46a of the automobile, a centrifugal air-blower for generating airflow to be directed into the passenger compartment through the air duct 2, and a refrigeration cycle 3 having an evaporator 27 for cooling air flowing through the air duct 2 and a gas cooler 22 for re-heating the air having passed through evaporator 27.

The air duct 2 is disposed at the front of the passenger compartment of the automobile. Upstream of the air duct 2 are an inside air suction port 11 for drawing air inside the passenger compartment (hereinafter referred to as the inside air) and an outside-air suction port 12 for drawing air outside the passenger compartment (hereinafter referred to as outside air). There is also provided an inside/outside air switching door 4 rotatably supported on the air passageway side of the inside air suction port 11 and the outside air suction port 12. The inside/outside air switching door 4 is driven by means of an actuator 13 such as a servomotor to switch the suction port mode between an outside air drawing (FRS) mode and an inside air circulating (REC) mode and the like.

Downstream of the air duct 2 in the direction of airflow, there are also provided a plurality of blowing openings (not shown). The plurality of blowing openings have at least a defroster (DEF) blowing opening for blowing mainly hot air toward the inner surface of a glass window of the automobile, a face (FACE) blowing opening for blowing mainly cool air toward the upper body (the head and chest portions) of a passenger, and a foot (FOOT) blowing opening for blowing mainly hot air toward the lower body (the foot portion) of a passenger. The plurality of blowing openings are selectively opened or closed by means of a plurality of mode switching doors (not shown). The plurality of mode switching doors are driven by means of an actuator 14 such as a servomotor to switch the blowing mode (MODE) between a face (FACE) mode, a bi-level (B/L) mode, a foot (FOOT) mode, a foot defroster (F/D) mode, and a defroster (DEF) mode.

A centrifugal air blower has a centrifugal fan 5 rotatably housed in a scroll casing that is integrated with the air duct 2 upstream thereof in the direction of airflow and a blower motor 16 for rotatably driving the centrifugal fan 5 and so on. The rotational speed of the blower motor 16 is changed in accordance with a blower motor terminal voltage, that is, a blower control voltage corresponding to a blower level, applied via a blower drive circuit (not shown), thereby controlling the amount of conditioned air to be directed into the passenger compartment.

The refrigeration cycle 3 has a compressor 21, a gas cooler 22, a first decompressing portion, an external heat exchanger 24, an internal heat exchanger, a second decompressing portion, an evaporator 27, an accumulator 28, and refrigerant piping for annularly connecting these components. The compressor 21 is a motor-driven refrigerant compressor that is rotatably driven by means of a built-in drive motor (not shown) to temporarily compress a refrigerant drawn from the evaporator 27 to high temperatures and pressures greater than or equal to the critical pressure under service conditions for discharge. The compressor 21 starts when activated (turned ON) and stops when deactivated (turned OFF). Additionally, the rotational speed of the compressor 21 is controlled by means of an inverter 20 to a target rotational speed determined by the ECU 10.

The gas cooler 22 is a heating heat exchanger that is disposed downstream of the evaporator 27 in the direction of airflow within the air duct 2 and heats the air passing therethrough by heat exchange with a refrigerant gas drawn out of the compressor 21. At the air inlet portion and the air outlet portion of the gas cooler 22, air mix (A/M) doors 6, 7 are rotatably supported to adjust the quantity of airflow passing through the gas cooler 22 and the quantity of airflow bypassing the gas cooler 22 in order to control the blowing temperature of the air blown into the passenger compartment. These A/M doors 6, 7 are driven by means of an actuator 15 such as a servomotor.

The first decompressing portion comprises a heating variable throttle valve 23 into which the refrigerant gas flows from the gas cooler 22, and a bypass conduit 31 for allowing the refrigerant gas flowing out of the gas cooler 22 to bypass the heating variable throttle valve 23 and to be directed to the external heat exchanger 24. The heating variable throttle valve 23 is a first decompressing device for decompressing the refrigerant flowing out of the gas cooler 22 in accordance with the degree of valve opening, employing a heating motor-driven expansion valve (EVH) the degree of opening of which is electrically controlled by the ECU 10. The bypass conduit 31 is provided with an electromagnetic open/close valve, VC, hereinafter referred to as a cooling electromagnetic valve 32 which is opened when activated (turned ON) and closed when deactivated (turned OFF).

For example, the external heat exchanger 24 is installed at a portion external to the air duct 2 and allows for readily receiving traveling air produced upon running of the automobile (more specifically, at the front of the engine room or the like) to exchange heat between the refrigerant flowing therethrough and air outside the passenger compartment (outside air) blown by a motor-driven fan (not shown). The external heat exchanger 24 operates as a heat absorber for absorbing heat from outside air in the heating mode or the dehumidifying mode, while operating as a heat radiator for radiating heat to outside air in the cooling mode or the dehumidifying mode.

The internal heat exchanger is a refrigerant-to-refrigerant heat exchanger which exchanges heat between a hot-side refrigerant flowing out of the outlet portion of the external heat exchanger 24 and a cold-side refrigerant flowing out of the outlet portion of the accumulator 28 in order to further evaporate the refrigerant drawn into the suction port of the compressor 21. The internal heat exchanger has a two-layered heat exchange configuration in which one surface of a cold-side heat exchanger 29 is in a close proximity heat-exchangeable contact with one surface of a hot-side heat exchanger 25.

The hot-side heat exchanger 25 in the internal heat exchanger comprises a refrigerant circuit conduit through which the refrigerant introduced from the outlet portion of the external heat exchanger 24 flows. The cold-side heat exchanger 29 in the internal heat exchanger also comprises a refrigerant circuit conduit through which the refrigerant introduced from the outlet portion of the accumulator 28 flows. The cold-side heat exchanger 29 is designed to exchange heat between the refrigerants along the entire length of the refrigerant circuit conduit from the refrigerant inlet portion to the refrigerant outlet portion of the hot-side heat exchanger 25 in the internal heat exchanger.

The second decompressing portion has a cooling variable throttle valve 26 in to which the refrigerant flows from the hot-side heat exchanger 25 in the internal heat exchanger, and a bypass conduit 33 for allowing the refrigerant flowing out of the hot-side heat exchanger 25 in the internal heat exchanger to bypass the cooling variable throttle valve 26 and the evaporator 27 to be directed to the accumulator 28. The cooling variable throttle valve 26 is a second decompressing device for decompressing the refrigerant flowing out of the hot-side heat exchanger 25 in the internal heat exchanger in accordance with the degree of valve opening. The cooling variable throttle valve 26 employs a cooling motor-driven expansion valve (EVC) the degree of opening of which is electrically controlled by the ECU 10. The bypass conduit 33 is provided with an electromagnetic open/close valve, VH, hereinafter referred to as a heating electromagnetic valve 34, which is opened when activated (turned ON) and closed when deactivated (turned OFF).

The evaporator 27 is an air-to-refrigerant heat exchanger (heat absorber) which exchanges heat between the refrigerant decompressed at the cooling variable throttle valve 26 and the air, serving as a heat-absorbed fluid, blown by the centrifugal fan 5 to thereby evaporate the refrigerant, thereby supplying a refrigerant gas via the accumulator 28 to the cold-side heat exchanger 29 in the internal heat exchanger and the compressor 21. The accumulator 28 is a gas-liquid separator having a reservoir chamber for temporarily reserving the refrigerant introduced from the evaporator 27.

Circulation circuit switching means of the refrigeration cycle 3 switches the operation mode of the refrigeration cycle 3, i.e., the circulation path of the refrigerant in the refrigeration cycle 3 to either one of a cooling mode circulation circuit (cooling cycle), a heating mode circulation circuit (heating cycle), and a dehumidifying mode circulation circuit (dehumidifying cycle). In this embodiment, the aforementioned circulation circuit switching means corresponds to the cooling electromagnetic valve 32 and the heating electromagnetic valve 34. More specifically, opening the cooling electromagnetic valve 32 and closing the heating electromagnetic valve 34 will cause the refrigeration cycle 3 to operate in the cooling cycle (the cooling mode circulation circuit). Closing the cooling electromagnetic valve 32 and opening the heating electromagnetic valve 34 will cause the refrigeration cycle 3 to operate in the heating cycle (the heating mode circulation circuit). Closing both the cooling electromagnetic valve 32 and the heating electromagnetic valve 34 will cause the refrigeration cycle 3 to operate in the dehumidifying cycle (the dehumidifying mode circulation circuit).

The refrigeration cycle 3 according to this embodiment employs, for example, a refrigerant predominantly composed of carbon dioxide ($CO_2$) having a low critical temperature, and a supercritical vapor compressive heat pump cycle in which the high pressure of the refrigerant discharged from the discharge port of the compressor 21 is greater than or equal to the critical pressure of the refrigerant. The supercritical vapor compressive heat pump cycle allows an increase in the high pressure-side refrigerant pressure to raise the refrigerant temperature at the inlet portion of the gas cooler 22 (the inlet temperature of the refrigerant), i.e., the discharge temperature of the refrigerant to be discharged from the discharge port of the compressor 21, for example, up to about 120° C. The refrigerant introduced into the gas cooler 22 would not be condensed and liquefied even when dissipating heat in the gas cooler 22 because the refrigerant has been pressurized to the critical pressure or higher in the compressor 21.

The ECU 10 comprises a CPU for performing control processing and arithmetic processing, a memory (ROM or RAM) for storing various programs and data, an I/O port, and a timer. The ECU 10 itself contains a built-in microcomputer having a well-known configuration. When the ignition switch is turned ON (IG•ON), the ECU 10 is supplied with power by an ECU power supply to electrically control each actuator of the air conditioning unit 1. Examples of the actuators are the servomotors 13 to 15, the blower motor 16, each of the heating variable throttle valves 23, 26, each of the cooling electromagnetic valves 32, 34, and the inverter 20. The actuators are controlled in accordance with a control signal from an air conditioner control panel (not shown) or the like, a sensor signal from various sensors, and a control program stored in memory.

The air conditioner control panel is provided with a temperature setting switch 39, an air conditioner (A/C) switch, a suction port switch (for switching between FRS and REC), a blowing opening mode setting (MODE switching) switch, a defroster (DEF) switch, an airflow setting switch, an auto (AUTO) switch, an off (OFF) switch and so on. The air conditioner (A/C) switch is a cooling or dehumidifying switch for requesting cooling or dehumidification of the automobile passenger compartment as well as a cooling or dehumidifying mode setting means for requesting any one of multiple operational modes of the refrigeration cycle 3, i.e., the cooling mode or the dehumidifying mode. It may also be acceptable to design the A/C switch such that turning it on causes the compressor 21 of the refrigeration cycle 3 to be forcedly started while turning it off causes the compressor 21 to stop running.

On the other hand, the DEF switch is a DEF mode fix switch for issuing a command for fixing the blowing opening mode to the DEF mode as well as a defogging switch for requesting defogging of the front windshield of the automobile or preventing fogging of the front windshield. The DEF switch is also a dehumidifying mode selection means for issuing a command for fixing the operation mode of the refrigeration cycle 3 to the dehumidifying mode as well as a dehumidifying mode setting means for setting either a dehumidifying mode of the dehumidifying priority mode or the blowing temperature priority mode. Instead of the DEF switch, without issuing a command for fixing the blowing opening mode to the DEF mode, it is also acceptable to provide for the dehumidifying mode setting means, such as the dehumidifying or defogging switch, for requesting only the dehumidification of the passenger compartment of the automobile or defogging of the front windshield of the automobile in an ON state and a defogging sensor for sensing the state of the defogging of the front windshield.

The auto (AUTO) switch is designed to issue a command for automatically setting the operation mode of the refrigeration cycle 3 to either one of the cooling mode, the heating mode, and the dehumidifying mode at least in accordance with a target blowing temperature (TAO). The auto (AUTO) switch is also an automatic control switch for issuing a command for automatically controlling each actuator of the air conditioning unit 1, for example, allowing the automatic air conditioning control such as the blowing opening mode switching control or the blower motor control to be released when the MODE switching switch or the airflow setting switch or the like is actuated.

There are sensor signals provided by a discharge pressure sensor 40 for sensing the discharge pressure (SP) of a refrigerant discharged from the discharge port of the compressor 21, a discharge temperature sensor 41 for sensing the discharge temperature (TD) of a refrigerant discharged from the discharge port of the compressor 21, a first refrigerant temperature sensor (corresponding to the first refrigerant temperature sensing means according to the present invention) 42 for sensing the gas cooler outlet temperature (TCO) of a refrigerant flowing out of the outlet portion of the gas cooler 22, and a second refrigerant temperature sensor (corresponding to the second refrigerant temperature sensing means according to the present invention) 43 for sensing the external heat exchanger outlet temperature (THO) of a refrigerant flowing out of the outlet portion of the external heat exchanger 24. These sensor signals are converted from analog to digital in an input circuit (A-to-D converter circuit) (not shown) and then allowed into the microcomputer. The discharge pressure sensor 40 is a high-pressure sensing means for sensing the high pressure of the refrigeration cycle 3. The discharge temperature sensor 41 is a refrigerant inlet temperature sensing means for sensing the inlet temperature of a refrigerant flowing into the inlet portion of the gas cooler 22.

There are also sensor signals provided by an outside-air temperature sensor 44 for sensing the outside-air temperature (TAM) or the temperature of air outside the passenger compartment, an after-evaporator temperature sensor (corresponding to the dehumidifying capacity sensing means according to the present invention) 45 for sensing the temperature of air immediately downstream of the evaporator 27 (TE; hereinafter referred to as the after-evaporator temperature), an inside air temperature sensor 46 for sensing the inside air temperature (TR) or the temperature of air inside the passenger compartment, a solar radiation sensor 47 for sensing the amount of solar radiation (TS) received by the passenger compartment, and an after-gas-cooler temperature sensor (corresponding to the heating capacity sensing means according to the present invention) 48 for sensing the temperature of air immediately downstream of the gas cooler 22 (TGC; hereinafter referred to as the after-gas-cooler temperature). These sensor signals are converted from analog to digital in the A-to-D converter circuit and then allowed into the microcomputer.

Control Method According to the First Embodiment

Figure 3:
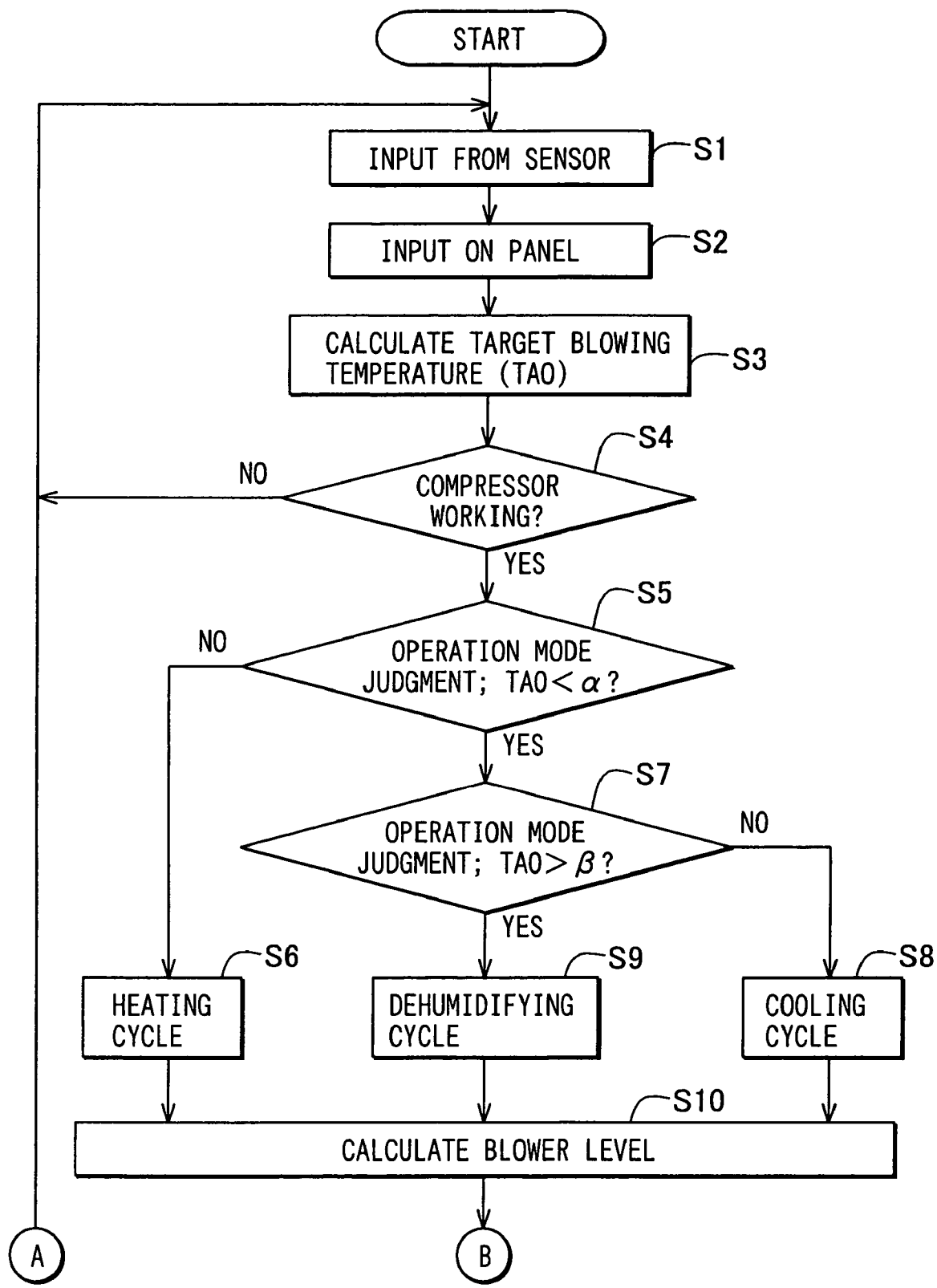
FIG. 3 is a flowchart showing the main routine of a control program stored in a memory according to the first embodiment of the present invention.
Figure 4:
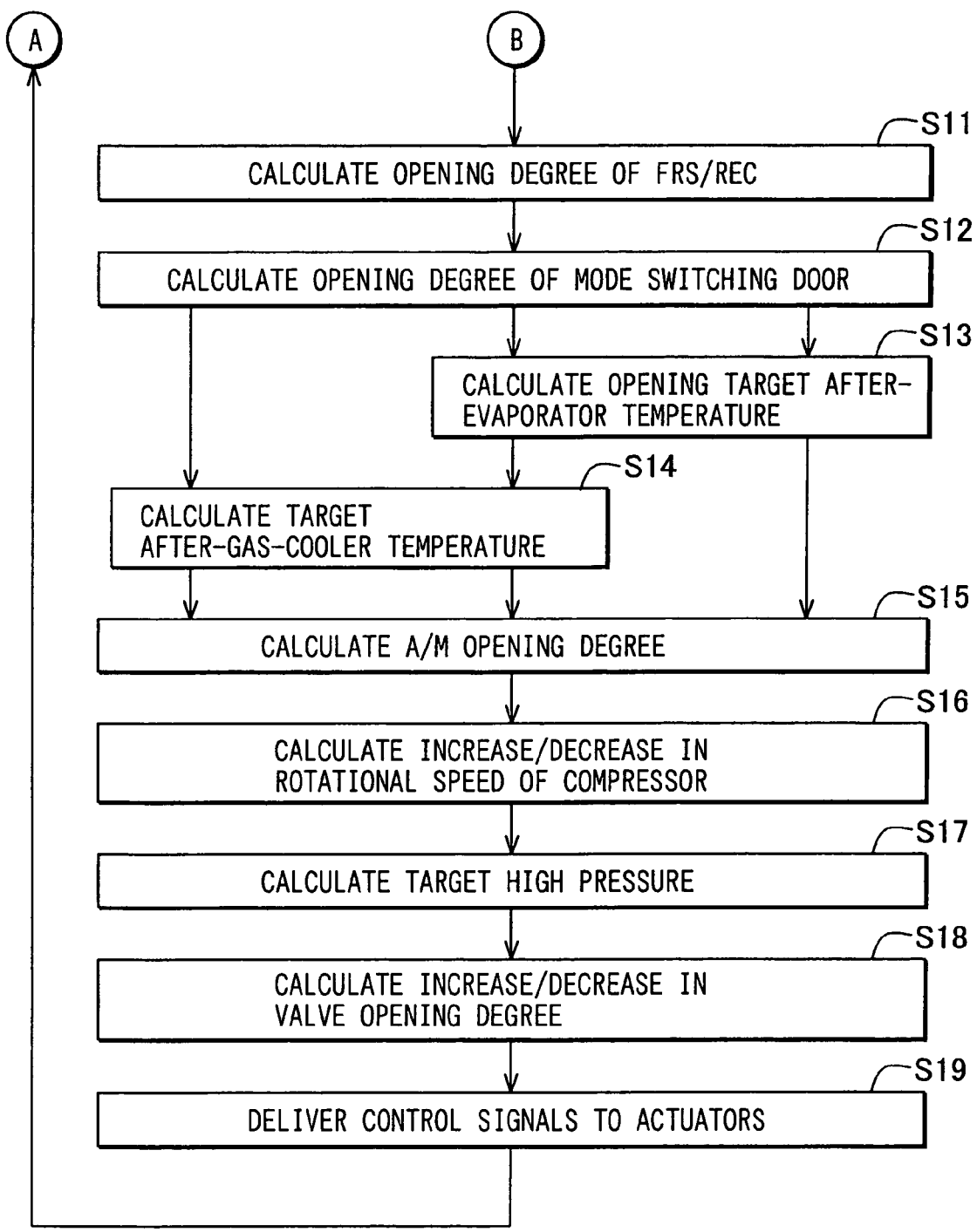
FIG. 4 is a flowchart showing the main routine of the control program stored in the memory according to the first embodiment of the present invention.
Figure 5:
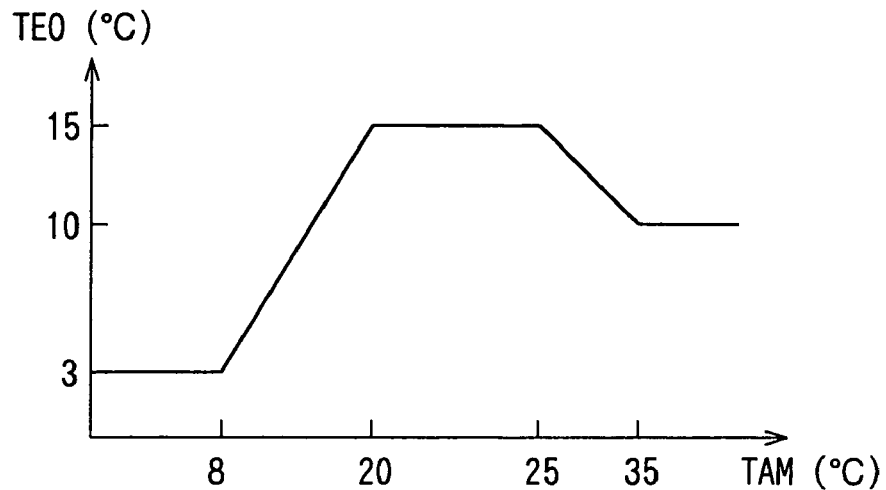
FIG. 5 is a graph showing the relationship between a target after-evaporator temperature and an outside air temperature according to the first embodiment of the present invention.

Now, a method for controlling air conditioning by the ECU 10 according to this embodiment will be briefly described with reference to FIGS. 1 to 7. FIGS. 3 and 4 are flowcharts showing the main routine of the control program stored in the memory. The flowchart according to this embodiment corresponds to the main routine of the control program stored in the memory and is started when the ignition switch is switched from OFF to ON to supply the ECU power to the ECU 10, which is executed at every predetermined time, when necessary. On the other hand, the flowchart will be intentionally terminated when the ignition switch is switched from ON to OFF to stop supplying the ECU power to the ECU 10.

First, sensor signals are acquired from various sensors necessary to control each air conditioning device (actuators) in the air conditioning unit 1 for conditioning the passenger compartment of the automobile (the cycle efficiency sensing means, the high-pressure sensing means, the first refrigerant temperature sensing means, the second refrigerant temperature sensing means, the dehumidifying capacity sensing means, the heating capacity sensing means, and the rotational speed sensing means; step S1). Then, a control signal is acquired from the air conditioner control panel (step S2). Subsequently, in accordance with the following arithmetic equation, or Equation 1, which is pre-stored in the memory, the target blowing temperature (TAO) of conditioned air blown into the passenger compartment of the automobile is calculated (the blowing temperature determination means; step S3).

$$TAO=KSET \times TSET-KR \times TR-KAM \times TAM-KS \times TS+C \quad [\text{Equation 1}]$$

where TSET is the set point temperature set by the temperature setting switch 39, TR is the inside air temperature sensed by the inside air temperature sensor 46, TAM is the outside-air temperature sensed by the outside-air temperature sensor 44, TS is the amount of solar radiation sensed by the solar radiation sensor 47, KSET, KR, KAM, and KS are gains, and C is a correction constant.

Then, a determination of whether the compressor is working is made to judge whether the compressor 21 should be turned ON or OFF. This determination of whether the compressor is working is provided, for example, by judging whether the air conditioner (A/C) switch has been turned ON (step S4). If the result of the judgment is NO, the process repeats the control processing of step S1 onward.

On the other hand, if the result of the judgment in step S4 is YES, an operation mode determination is made to determine the operation mode of the refrigeration cycle 3 in accordance with the target blowing temperature (TAO) calculated in step S3. First, it is determined whether the target blowing temperature (TAO) is lower in temperature than a predetermined value ($\alpha$: e.g., 45° C.) (step S5). If the result of the determination is NO, i.e., TAO$\geq\alpha$, the process selects the heating cycle (heating mode) as the operation mode of the refrigeration cycle 3 (step S6). Thereafter, the process proceeds to the computational processing in step S10.

On the other hand, if the result of the determination in step S5 is YES, it is determined whether the target blowing temperature (TAO) is higher in temperature than a predetermined value ($\beta$: e.g., 15° C.) (step S7). If the result of the determination is NO, i.e., TAO$\leq\beta$, the process selects the cooling cycle (cooling mode) as the operation mode of the refrigeration cycle 3 (step S8).

On the other hand, if the result of the determination in step S7 is YES, i.e., $\beta<$TAO$<\alpha$, the process selects the dehumidifying cycle (dehumidifying mode) as the operation mode of the refrigeration cycle 3 (step S9). Then, from the characteristic diagram (map) pre-stored in memory, the blower motor terminal voltage (a blower control voltage or blower level) to be applied to the blower motor 16 corresponding to the target blowing temperature (TAO) (step S10) is calculated.

Then, in accordance with the control state (input state) of the suction port setting switch (for switching between FRS and REC) provided on the air conditioner control panel, the process calculates the degree of opening of the inside/outside air switching door 4 for switching the suction port mode (inside/outside-air mode) (step S11). Here, to determine the suction port mode, either suction port mode of the outside air drawing (FRS) mode or the inside air circulating (REC) mode may be selected according to the input state of the suction port setting switch, or alternatively either suction port mode of the outside air drawing (FRS) mode or the inside air circulating (REC) mode may be selected according to the target blowing temperature (TAO).

Then, in accordance with the control state (input state) of the blowing opening mode setting (MODE switching) switch or the DEF switch provided on the air conditioner control panel, the process calculates the degree of opening of a plurality of mode switching doors for switching the blowing opening mode (step S12). Here, to determine the blowing opening mode, any blowing opening mode of the FACE mode, the B/L mode, the FOOT mode, the F/D mode, and the DEF mode may be determined according to the input state of the blowing opening mode setting switch or the DEF switch. Alternatively, the FACE mode, the B/L mode, and the FOOT mode may be determined in increasing order of temperature of the target blowing temperature (TAO).

Then, when the cooling mode or the dehumidifying mode has been selected as the operation mode of the refrigeration cycle 3, the process calculates the target after-evaporator temperature (TEO) (step S13). In the cooling mode, the target after-evaporator temperature (TEO) is defined so that TEO=TAO. Additionally, to provide improved comfort in a conditioned space in the automobile passenger compartment and thereby prevent any passengers from feeling any humidity therein, for example, an arithmetic equation such as TEO=f1 (TAM) is used to determine the target after-evaporator temperature (TEO) in the dehumidifying mode. On the other hand, to ensure the amount of dehumidification necessary to defog the inner surface of the front windshield, the TEO in the dehumidifying mode may be determined relative to the outside air temperature (TAM) sensed by the outside air temperature sensor 44 as shown in the characteristic diagram (map) of FIG. 5, which is pre-stored in the memory.

On the other hand, when the heating mode or the dehumidifying mode is selected as the operation mode of the refrigeration cycle 3, the process calculates a target after-gas-cooler temperature (TGCO) (step S14). In the heating mode, the target after-gas-cooler temperature (TGCO) is defined so that TGCO=TAO. Suppose that the B/L mode has been selected as the blowing opening mode, or the operation mode is the dehumidifying mode. In this case, to provide an improved feeling of conditioned air during the intermediate period, the target after-gas-cooler temperature (TGCO) is defined such that TGCO=a×TAO+b×TE+c, where TE is the temperature (the after-evaporator temperature) of air immediately downstream of the evaporator 27 sensed by the after-evaporator temperature sensor 45.

Here, the constants a, b, and c can be determined such that TGCO is higher in temperature than TAO, thereby allowing the degree of opening of the air mix door to be controlled to an intermediate degree of opening such as 50% in the following step S15. Accordingly, this makes it possible to provide conditioned air at a low blowing temperature from the FACE blowing opening and at a high blowing temperature from the FOOT blowing opening, thereby creating a comfortable conditioned space of a head-cooling foot-heating type in the passenger compartment of the automobile.

Then, in accordance with the following arithmetic equation, or Equation 2, pre-stored in the memory, the process calculates the degree of opening (A/M opening) of the two A/M doors 6, 7 for adjusting the amount of air passing through the gas cooler 22 and the amount of air bypassing the gas cooler 22 to control the actual blowing temperature (step S15).

$$SW=[\{TAO-(TE+a)\}/\{TGC-(TE+a)\}]\times 100 \ (\%) \quad \text{[Equation 2]}$$

where TAO is the target blowing temperature calculated in the foregoing step S3, TE is the temperature (the after-evaporator temperature) of air immediately downstream of the evaporator 27 sensed by the after-evaporator temperature sensor 45, TGC is the temperature (the after-gas-cooler temperature) of air immediately downstream of the gas cooler 22 sensed by the after-gas-cooler temperature sensor 48, and "a" is a correction coefficient.

As can be seen from the foregoing Equation 2, since the aforementioned target after-evaporator temperature (TEO) is calculated with TEO=TAO, e.g., during a constant cooling operation, the A/M doors 6, 7 is automatically calculated to be 0% (MAX COOL). When the set point temperature is changed to a higher point, TAO is determined to be higher while TEO is updated to be higher. The A/M doors 6, 7 are controlled to transiently open at the same time as the set point temperature is changed, thereby making it possible to eliminate a delay in response to a change in the blowing temperature as is the case with the re-heating system.

Then, in accordance with the following arithmetic equation, or Equation 3, pre-stored in the memory, the process calculates an increase/decrease in the target rotational speed (IVOn) for the rotational speed of the compressor 21 (step S16). When the cooling mode has been selected as the operation mode of the refrigeration cycle 3, the process performs a fuzzy operation to calculate the amount of an increase/decrease in rotational speed of the compressor (Δf) based on the temperature deviation between a sensed value and a target value and the rate of change in the deviation so that the after-evaporator temperature (the sensed value; TE) sensed by the after-evaporator temperature sensor 45 agrees with the target after-evaporator temperature (the target value; TEO).

$$IVOn=IVOn-1+\Delta f, \quad \text{[Equation 3]}$$

where IVOn is the target rotational speed calculated at the current control timing, IVOn−1 is the target rotational speed calculated at the previous control timing, and Δf is an increase or a decrease in rotational speed of the compressor.

On the other hand, when the heating mode has been selected as the operation mode of the refrigeration cycle 3, the process performs a fuzzy operation to calculate the amount of an increase/decrease in rotational speed of the compressor (Δf) based on the temperature deviation between a sensed value and a target value and the rate of change in the deviation so that the after-gas-cooler temperature (the sensed value: TGC) sensed by the after-gas-cooler temperature sensor 48 agrees with the target after-gas-cooler temperature (the target value: TGCO). When the dehumidifying mode has been selected as the operation mode of the refrigeration cycle 3, the process proceeds to the subroutine of the control program (seethe flowchart shown in FIG. 6) for selecting either priority mode of the dehumidifying priority mode or the blowing temperature priority mode.

Figure 6:
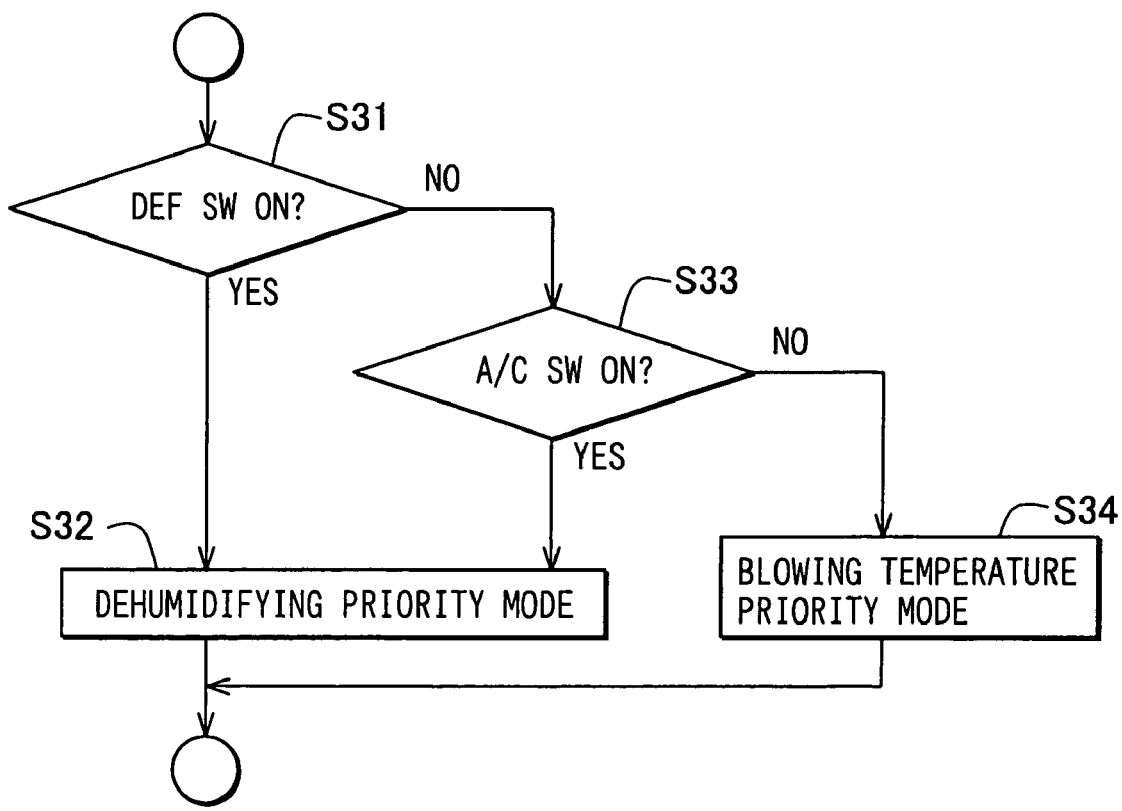
FIG. 6 is a flowchart showing a subroutine of the control program stored in the memory according to the first embodiment of the present invention.

When the subroutine of FIG. 6 is started, it is first determined whether the DEF switch, serving as a defogging switch for requesting defogging of the front windshield of the automobile, is in an ON state (step S31). If the result of the determination is YES, i.e., if the DEF switch is in an ON state, the compressor rotational speed control selects the dehumidifying priority mode (step S32). Here, like in the cooling mode, the process performs a fuzzy operation in the dehumidifying priority mode to calculate the amount of an increase/decrease in rotational speed of the compressor (Δf) based on the temperature deviation between a sensed value and a target value and the rate of change in the deviation so that the after-evaporator temperature (the sensed value: TE) agrees with the target after-evaporator temperature (the target value: TEO).

On the other hand, if the result of the determination is NO in step S31, i.e., if the DEF switch is in an OFF state, it is determined whether the A/C switch, serving as a dehumidifying switch for requesting dehumidification the passenger compartment of the automobile, is in an ON state (step S33). If the result of the determination is YES, i.e., if the A/C switch is in an ON state, the process proceeds to step S32 to select the aforementioned dehumidifying priority mode, like in the case where the DEF switch is in an ON state.

On the other hand, if the result of the determination is NO in step S33, the process selects the blowing temperature priority mode when the A/C switch is in an OFF state, e.g., the AUTO switch is in an ON state and in a transition period during which a change in the target blowing temperature (TAO) causes a transition from the heating mode to the dehumidifying mode (step S34). Here, like in the heating mode, the process performs a fuzzy operation in the blowing temperature priority mode to calculate the amount of an increase/decrease in rotational speed of the compressor (Δf) based on the temperature deviation between a sensed value and a target value and the rate of change in the deviation so that the after-gas-cooler temperature (the sensed value: TGC) agrees with the target after-gas-cooler temperature (the target value: TGCO).

Here, suppose that the dehumidifying mode has been selected as the operation mode of the refrigeration cycle 3. Even in this case, the object to be controlled, for which the amount of an increase/decrease in rotational speed of the compressor (Δf) is calculated, is changed between the dehumidifying priority mode and the blowing temperature priority mode. This is because the control target value at that time can be reached in a shorter period of time by controlling the rotational speed of the compressor 21 than by the high pressure control over the refrigeration cycle 3 with the heating variable throttle valve 23 and the control over the after-evaporator temperature or the after-gas-cooler temperature (control over the blowing temperature) with the cooling variable throttle valve 26, which are discussed later.

Then, to allow the refrigeration cycle 3 to operate at the maximum efficiency (thereby saving the mechanical and electrical power thereof) and thus provide the maximum cycle efficiency thereto, the process calculates a target high pressure (SPO) from the external heat exchanger outlet refrigerant temperature (THO) sensed by the second refrigerant temperature sensor 43 when the cooling mode has been selected as the operation mode of the refrigeration cycle 3. On the other hand, when the heating mode has been selected as the operation mode of the refrigeration cycle 3, the process calculates the target high pressure (SPO) from the gas cooler outlet refrigerant temperature (TCO) sensed by the first refrigerant temperature sensor 42 (step S17).

Then, the process calculates an increase or a decrease in the degree of opening of the cooling variable throttle valve 26 or the heating variable throttle valve 23 so that the target high pressure (SPO) calculated in step S17 is reached (step S18). Then, a control signal is delivered to each air conditioning device (actuators) of the air conditioning unit 1 so that the target value calculated in each of the foregoing steps is reached (step S19).

Here, when the dehumidifying mode has been selected as the operation mode of the refrigeration cycle 3 in addition to the blowing temperature priority mode, the degree of opening of the heating variable throttle valve 23 is changed to a given degree of opening to thereby control the high pressure of the refrigeration cycle 3, while the degree of opening of the cooling variable throttle valve 26 is changed to a given degree of opening to thereby control the dehumidifying capacity of the evaporator 27, i.e., the after-evaporator temperature. On the other hand, when the dehumidifying mode has been selected as the operation mode of the refrigeration cycle 3 in addition to the dehumidifying priority mode, the degree of opening of the heating variable throttle valve 23 is controlled to a given degree of opening to thereby control the high pressure of the refrigeration cycle 3, while the degree of opening of the cooling variable throttle valve 26 is changed to a given degree of opening to thereby control the heating capacity (the blowing temperature) of the gas cooler 22.

Accordingly, when the blowing temperature priority mode has been selected, the high pressure at which the cycle efficiency calculated from the gas cooler outlet refrigerant temperature is at maximum is defined as the target high pressure (the target value; SPO). Additionally, the process performs a fuzzy operation to calculate an increase/decrease in valve opening (ΔEVH) of the heating variable throttle valve 23 based on the pressure deviation between the target high pressure (the target value: SPO) and the discharge pressure (SP) of a refrigerant discharged from the discharge outlet of the compressor 21 and the rate of change in the deviation. The process also performs a fuzzy operation to calculate an increase/decrease in valve opening (ΔEVH) of the cooling variable throttle valve 26 based on the temperature deviation between the target after-evaporator temperature (TEO) calculated in step S13 and the after-evaporator temperature (the sensed value: TE) sensed by the after-evaporator temperature sensor 45 and the rate of change in the deviation.

On the other hand, when the dehumidifying priority mode has been selected, the high pressure at which the cycle efficiency calculated from the gas cooler outlet refrigerant temperature is at maximum is defined as the target high pressure (the target value: SPO). Additionally, the process performs a fuzzy operation to calculate an increase/decrease in valve opening (ΔEVH) of the heating variable throttle valve 23 based on the pressure deviation between the target high pressure (the target value: SPO) and the discharge pressure (SP) of a refrigerant discharged from the discharge outlet of the compressor 21 and the rate of change in the deviation. The process also performs a fuzzy operation to calculate an increase/decrease in valve opening (ΔEVH) of the cooling variable throttle valve 26 based on the temperature deviation between the target after-gas-cooler temperature (TGCO) calculated in step S14 and the after-gas-cooler temperature (TGC) sensed by the after-gas-cooler temperature sensor 48 and the rate of change in the deviation.

Figure 7:
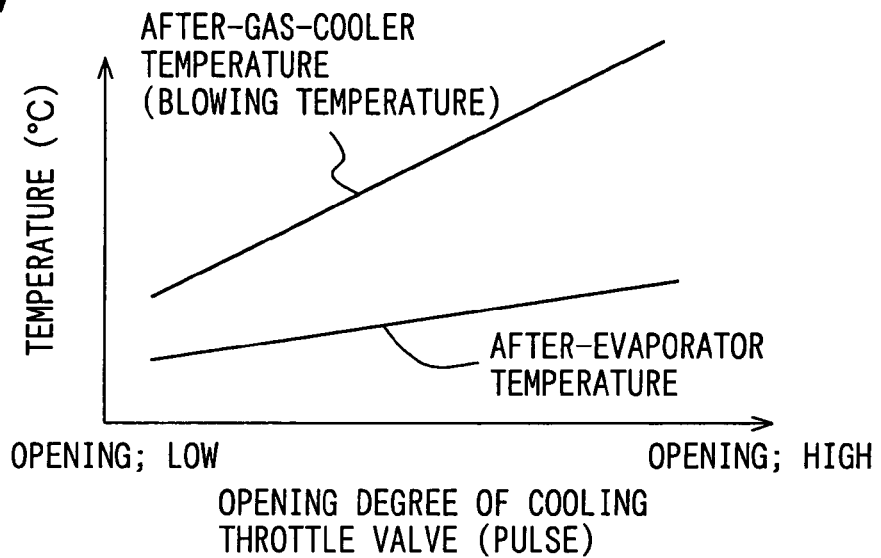
FIG. 7 is a graph showing the relation between the degree of opening of a cooling expansion valve, the after-gas-cooler temperature (blowing temperature), and the after-evaporator temperature according to the first embodiment of the present invention.

Here, the relation between the cooling variable throttle valve 26 and the after-gas-cooler temperature (the blowing temperature)/the after-evaporator temperature is as shown in the graph in FIG. 7. Accordingly, when the after-evaporator temperature (TE) is higher than the target after-evaporator temperature (TEO) in the blowing temperature priority mode, the increase/decrease in valve opening (ΔEVH) of the cooling variable throttle valve 26 is calculated to have a negative value, so that the process controls the cooling variable throttle valve 26 to have a lower degree of valve opening.

[Operation of the First Embodiment]

Now, the operation of the vehicle air conditioning system according to this embodiment will be briefly described with reference to FIGS. 1 to 7.

When the cooling mode has been selected as the operation mode of the refrigeration cycle 3, the cooling electromagnetic valve 32 is opened and the heating electromagnetic valve 34 is closed. Accordingly, the refrigerant discharged from the discharge outlet of the compressor 21 circulates through a path from the gas cooler 22, through the cooling electromagnetic valve 32, the external heat exchanger 24, the hot-side heat exchanger 25, the cooling variable throttle valve 26, the evaporator 27, the accumulator 28, and the cold-side heat exchanger 29 to the compressor 21 (the cooling mode circulation circuit in the cooling cycle).

When the cooling mode has been selected here, the process controls the degree of opening of the A/M doors 6, 7, installed at the inlet and outlet portions of the gas cooler 22 to be fully closed (MAX·COOL), allowing the high pressure and temperature refrigerant discharged from the discharge outlet of the compressor 21 to radiate no heat upon passing through the gas cooler 22. Therefore, the air cooled down upon passing through the evaporator 27 flows in the air duct 2 bypassing the gas cooler 22 and is blown, for example, from the FACE blowing opening into the passenger compartment of the automobile to cool the passenger compartment so that the temperature in the passenger compartment reaches a desired temperature (the set point temperature). On the other hand, the internal heat exchanger exchanges heat between the high temperature and pressure refrigerant flowing out of the external heat exchanger 24 to flow in the hot-side heat exchanger 25 and the low temperature and pressure refrigerant flowing out of the accumulator 28 to flow in the cold-side heat exchanger 29, thereby cooling the high temperature and pressure refrigerant introduced into the evaporator 27. This causes an increase in enthalpy in the evaporator, thereby providing an improved cycle efficiency to the refrigeration cycle 3 by saving the mechanical and electrical power thereof.

On the other hand, when the heating mode has been selected as the operation mode of the refrigeration cycle 3, the cooling electromagnetic valve 32 is closed and the heating electromagnetic valve 34 is opened. Accordingly, the refrigerant discharged from the discharge outlet of the compressor 21 circulates through a path from the gas cooler 22, through the heating variable throttle valve 23, the external heat exchanger 24, the hot-side heat exchanger 25, the heating electromagnetic valve 34, the accumulator 28, and the cold-side heat exchanger 29 to the compressor 21 (the heating mode circulation circuit in the heating cycle).

In the foregoing, the process controls the degree of opening of the aforementioned A/M doors 6, 7 to be fully opened (MAX•HOT), thereby allowing the high pressure and temperature refrigerant discharged from the discharge outlet of the compressor 21 to radiate heat by exchanging heat with the air flowing in the air duct 2 upon passing through the gas cooler 22. Then, for example, the air is blown from the FOOT blowing opening into the passenger compartment of the automobile to heat the passenger compartment so that the temperature in the passenger compartment reaches a desired temperature (the set point temperature). On the other hand, the internal heat exchanger performs no heat exchange because the low temperature and pressure refrigerant passes each through the hot-side heat exchanger 25 and the cold-side heat exchanger 29.

On the other hand, when the dehumidifying mode has been selected as the operation mode of the refrigeration cycle 3, both the cooling electromagnetic valve 32 and the heating electromagnetic valve 34 are closed. Accordingly, the refrigerant discharged from the discharge outlet of the compressor 21 circulates through a path from the gas cooler 22, through the heating variable throttle valve 23, the external heat exchanger 24, the hot-side heat exchanger 25, the cooling variable throttle valve 26, the evaporator 27, the accumulator 28, and the cold-side heat exchanger 29 to the compressor 21 (the dehumidifying mode circulation circuit in the dehumidifying cycle).

In the foregoing, the air cooled and dehumidified upon passing through the evaporator 27 is re-heated upon passing through the gas cooler 22. Then, for example, the air is blown from the DEF blowing opening or the FOOT blowing opening into the passenger compartment of the automobile to dehumidify and heat the passenger compartment so that the temperature in the passenger compartment reaches a desired temperature (the set point temperature) and the front windshield is defogged. Here, the discharge pressure of the refrigerant discharged from the compressor 21 and the pressure of the refrigerant in the external heat exchanger 24 are varied depending on the degree of throttle of the opening of the heating variable throttle valve 23 and the cooling variable throttle valve 26, thereby allowing the heating capacity of the gas cooler 22 (the after-gas-cooler temperature or the blowing temperature) or the dehumidifying capacity of the evaporator 27 (the after-evaporator temperature) to be controlled to the target value.

More specifically, suppose that control is provided such that the discharge pressure of the refrigerant discharged from the compressor 21 and the pressure of the refrigerant in the external heat exchanger 24 are set at a low pressure (with the degree of opening of the heating variable throttle valve 23 being small and the degree of opening of the cooling variable throttle valve 26 being high). In this case, since the external heat exchanger 24 functions (operates) as a heat absorber, the quantity of heat radiated by the gas cooler 22 is increased so that the blowing temperature of the conditioned air blown into the passenger compartment of the automobile becomes relatively high.

In contrast to this, suppose that control is provided such that the discharge pressure of the refrigerant discharged from the compressor 21 and the pressure of the refrigerant in the external heat exchanger 24 are set at a high pressure (with the degree of opening of the heating variable throttle valve 23 being high and the degree of opening of the cooling variable throttle valve 26 being low). In this case, since the external heat exchanger 24 functions (operates) as a heat radiator, the quantity of heat radiated by the gas cooler 22 is decreased so that the blowing temperature of the conditioned air blown into the passenger compartment of the automobile becomes relatively low.

[Effects of the First Embodiment]

As described above, according to the prior art, when the dehumidifying mode has been selected as the operation mode of the refrigeration cycle 3, a valve opening control pattern for a heating electronic expansion valve and a cooling electronic expansion valve is determined to provide control to the degree of opening of the heating electronic expansion valve and the cooling electronic expansion valve. In contrast to this, according to the vehicle air conditioning system of this embodiment, the target high pressure at which the cycle efficiency calculated from the gas cooler outlet refrigerant temperature is maximized is defined as a target value. Then, one of the valves or the heating variable throttle valve 23 is allowed to control the high pressure of the refrigeration cycle 3 to the target value.

This makes it possible to provide control such that the cycle efficiency of the refrigeration cycle 3 is maximized in a wide range of airflow from a low airflow region during an intermediate period to a high airflow region at a relatively low temperature of outside air (at about 10° C. of outside air). It is thus possible to save the mechanical and electrical power of the compressor 21 in the refrigeration cycle 3. Furthermore, even when the rotational speed of the compressor is increased due to a change in set point temperature or the like leading to an increase in the high pressure of the refrigeration cycle 3, control is provided to increase and/or decrease valve opening ($\Delta$EVH) of the heating variable throttle valve 23 in accordance with the high pressure of the refrigeration cycle 3, thereby making it possible to prevent the high pressure of the refrigeration cycle 3 from increasing to an abnormally high pressure.

Furthermore, determination of the dehumidifying mode (the dehumidifying priority mode or the blowing temperature priority mode) desired by a driver is made. For example, even when the operation mode of the refrigeration cycle 3 is changed due to a decrease in heated load during an auto mode or a change in set point temperature, this makes it possible to control each air conditioning device (actuators) of the air conditioning unit 1 to the target value without a significant drop in the blowing temperature of the conditioned air blown from the blowing opening of the air duct 2 into the passenger compartment of the automobile.

Furthermore, assume a condition that outside air is at a temperature of 10° C. or less where the target after-evaporator temperature is relatively low and the target after-gas-cooler temperature is high. Even in this condition, using a refrigerant predominantly composed of carbon dioxide ($CO_2$) having a low critical temperature allows the high pressure of the refrigerant discharged from the discharge outlet of the compressor 21 to work at a supercritical pressure greater than or equal to the critical pressure of the refrigerant, thereby facilitating the creation of a high temperature field. Additionally, since a low compression ratio is available, control can be provided with ease to the blowing temperature on the lower temperature region side when compared with a condensation cycle such as with a conventional HFC (Freon-based refrigerant). Therefore, the mechanical and electrical power of the compressor 21 in the refrigeration cycle 3 can be saved.

[Second Embodiment]

Figure 8:
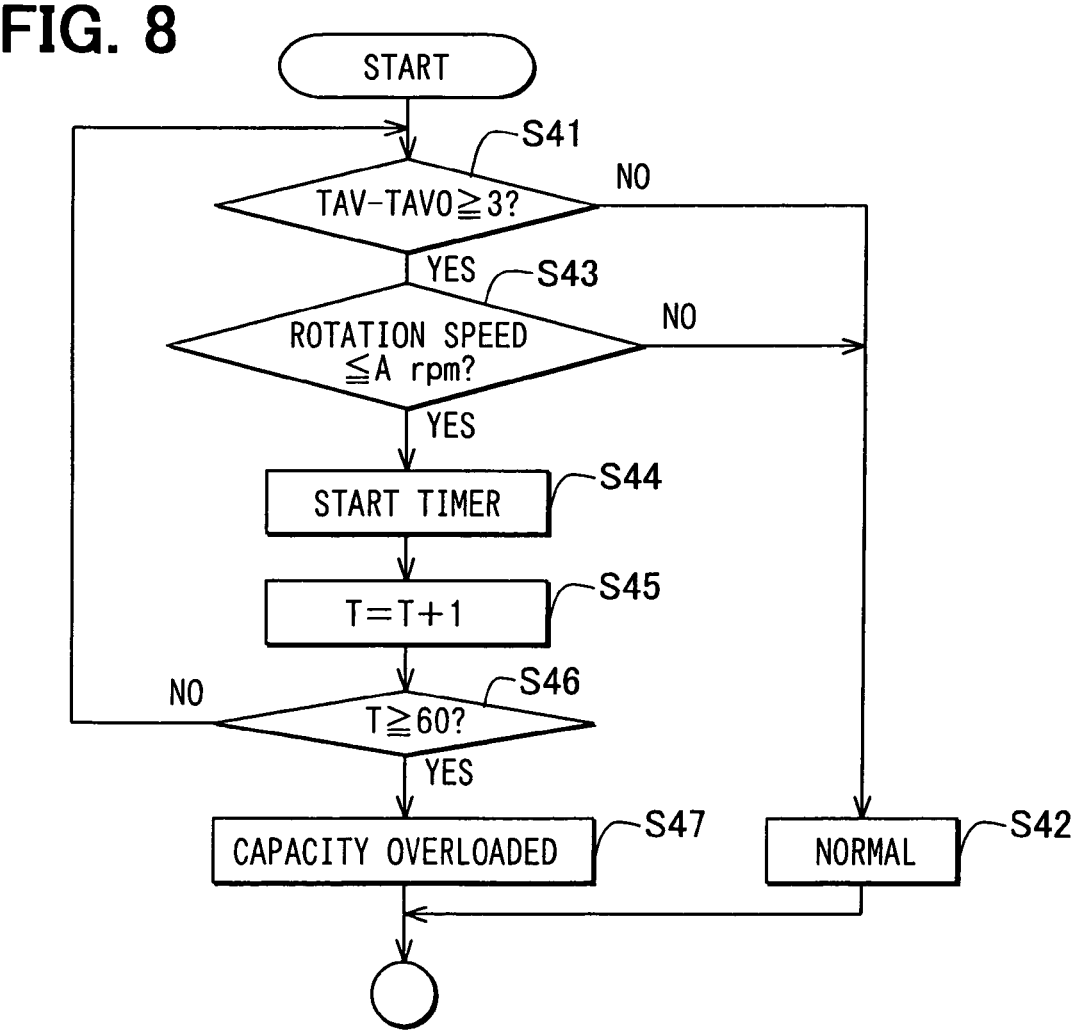
FIG. 8 is a flowchart showing a subroutine of the control program stored in the memory according to a second embodiment of the present invention.

FIG. 8 shows a second embodiment of the present invention, showing a flowchart representative of a subroutine of the control program stored in the memory. In the first embodiment, the target high pressure (a target value: SPO) is calculated in accordance with the gas cooler outlet refrigerant temperature (TCO) sensed by the first refrigerant temperature sensor (the first refrigerant temperature sensing means) 42. However, when the gas cooler 22 is checked for a capacity overload and determined to be overloaded, the target high pressure (the target value: SPO) may be calculated in accordance with the external heat exchanger outlet refrigerant temperature (THO) sensed by the second refrigerant temperature sensor (the second refrigerant temperature sensing means) 43. A control method for this case is shown in the flowchart shown in FIG. 8.

The subroutine of FIG. 8 is started when, in the arithmetic operation of step S17 in FIG. 4 for calculating the target high pressure, the dehumidifying mode has been selected as the operation mode of the refrigeration cycle 3 as a result of the determination of whether the dehumidifying mode has been selected as the operation mode of the refrigeration cycle 3. When the subroutine of FIG. 8 is started, the process first calculates the temperature deviation between the target after-gas-cooler temperature (TGCO, TAVO) calculated instep S14 of FIG. 3 and the after-gas-cooler temperature (TGC, TAV) sensed by the after-gas-cooler temperature sensor 48.

Subsequently, in accordance with the following arithmetic equation or Equation 4, it is determined whether the temperature deviation between the after-gas-cooler temperature (TAV) and the target after-gas-cooler temperature (TAVO) is greater than or equal to a predetermined value ($\alpha°$ C.) (the capacity overload sensing means: step S41). If the result of the determination is NO, the process determines that it is normal (step S42), and then calculates the target high pressure (the target value: SPO) in accordance with the gas cooler outlet refrigerant temperature (TCO) sensed by the first refrigerant temperature sensor 42.

$$TAV - TAVO \geq \alpha° \text{ C. (e.g., } \alpha = 3° \text{ C.).} \quad \text{[Equation 4]}$$

If this determination condition is satisfied, the after-gas-cooler temperature (TAV) is higher than the target after-gas-cooler temperature (the target value: TAVO). In the first embodiment, control is provided such that the A/M doors 6, 7 are slightly closed, relative to 100% of the degree of opening of the A/M doors 6, 7, at which the mechanical power can be saved most for the blowing temperature of the conditioned air blown into the passenger compartment of the automobile to approach the set point temperature. This situation indicates the gas cooler 22 being overloaded. However, since the gas cooler 22 can be temporarily overloaded due to a change in set point temperature (a downward change in set point temperature), it is determined in the following step S42 onward whether the gas cooler 22 is in a transient state.

On the other hand, when the result of the determination is YES in step S41, the process determines whether the rotational speed of the compressor is less than or equal to "A" rpm. Here, the constant "A" is set near the minimum rotational speed (the capacity overload sensing means and the rotational speed sensing means; step S43). When the result of the determination is NO, the process proceeds to the processing in step S42.

On the other hand, when the result of the determination is YES in step S43, the process allows the timer to start counting (step S44). Then, the count of the timer is counted up (step S45). Then, the process determines whether TAV−TAVO$\geq \alpha°$ C. and the state of the rotational speed of the compressor being $\leq$A rpm has continued for a predetermined period of time (e.g., 60 seconds) or more (the capacity overload sensing means: step S46). When the result of the determination is NO, the process repeats the processing in step S41 onward.

On the other hand, when the result of the determination is YES in step S46, i.e., when TAV−TAVO$\geq \alpha°$ C. and the state of the rotational speed of the compressor being $\leq$A rpm has continued for a predetermined period of time (e.g., 60 seconds) or more, the process determines that the gas cooler 22 is constantly overloaded (step S47). As described above, when the gas cooler 22 has been determined to be overloaded, the target high pressure (the target value: SPO) was calculated previously in accordance with the gas cooler outlet refrigerant temperature (TCO) sensed by the first refrigerant temperature sensor 42 (the first high-pressure determination means). However, the target high pressure (the target value: SPO) is calculated here in accordance with the external heat exchanger outlet refrigerant temperature (THO) sensed by the second refrigerant temperature sensor 43 (the second high-pressure determination means).

Accordingly, the object to be controlled for which the target high pressure (the target value: SPO) is calculated is changed from the gas cooler outlet refrigerant temperature (TCO) to the external heat exchanger outlet refrigerant temperature (THO), thereby causing the external heat exchanger 24 to change from the heat absorber to the heat radiator. The external heat exchanger 24 functioning (operating) from the heat absorber to the heat radiator allows the heated load of the gas cooler 22 to be reduced. Since this causes a drop in the blowing temperature of the conditioned air blown into the passenger compartment of the automobile as well as a decrease in the high pressure for balancing the refrigeration cycle 3, the mechanical and electrical power is better saved than by the gas cooler outlet refrigerant temperature (TCO) controlling the high pressure of the refrigeration cycle 3.

[Other Embodiment]

In the aforementioned embodiment, when the DEF switch is turned ON or the A/C switch is turned ON, the dehumidifying mode is to be set to the dehumidifying priority mode. However, the dehumidifying mode may be set to the dehumidifying priority mode when the F/D switch for issuing a command for fixing the blowing opening mode to the F/D mode is turned ON.

When the cooling mode has been selected as the operation mode of the refrigeration cycle 3, the aforementioned embodiment employed the cooling mode circulation circuit (the cooling cycle) in which the refrigerant discharged from the discharge outlet of the compressor 21 circulates through a path from the gas cooler 22, through the cooling electromagnetic valve 32, the external heat exchanger 24, the hot-side heat exchanger 25, the cooling variable throttle valve 26, the evaporator 27, the accumulator 28, and the cold-side heat exchanger 29 to the compressor 21. However, it is also acceptable to install the cooling electromagnetic valve 32 in a bypass conduit to directly connect between the discharge outlet of the compressor 21 and the inlet portion of the external heat exchanger 24. Then, when the cooling mode is selected as the operation mode of the refrigeration cycle 3, such a cooling mode circulation circuit (cooling cycle) may be employed in which the refrigerant discharged from the discharge outlet of the compressor 21 circulates through a path from the cooling electromagnetic valve 32, through the external heat exchanger 24, the cooling variable throttle valve 26, the evaporator 27, and the accumulator 28 to the compressor 21. Here, the internal heat exchanger may not be connected thereto.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A vehicle air conditioning system comprising:
   an air duct for blowing conditioned air into a passenger compartment;
   a refrigeration cycle having:
   a cooling heat exchanger disposed within said air duct to serve as a heat absorber in a dehumidifying mode;
   a heating heat exchanger disposed downstream of said cooling heat exchanger, in a direction of airflow within said air duct, to serve as a heat radiator in the dehumidifying mode;
   an external heat exchanger disposed external to said air duct to serve as a heat absorber or a heat radiator in the dehumidifying mode;
   a first variable throttle valve connected between said heating heat exchanger and said external heat exchanger, wherein said first variable throttle valve is capable of decompressing a refrigerant introduced from said heating heat exchanger as well as changing the degree of valve opening thereof;
   a second variable throttle valve connected between said external heat exchanger and said cooling heat exchanger, wherein said second variable throttle valve is capable of decompressing the refrigerant introduced from said external heat exchanger as well as changing the degree of valve opening thereof; and
   a dehumidifying mode circulation path for circulating refrigerant discharged from a refrigerant compressor along a path from said heating heat exchanger through said first variable throttle valve, said external heat exchanger, said second variable throttle valve, and said cooling heat exchanger to said refrigerant compressor;
   cycle efficiency sensing means for sensing a current cycle efficiency;
   cycle efficiency determination means for calculating a target cycle efficiency;
   first throttle valve control means for controlling the degree of opening of said first variable throttle valve in the dehumidifying mode in accordance with a deviation between said target cycle efficiency set by said cycle efficiency determination means and said current cycle efficiency sensed by said cycle efficiency sensing means; and
   second throttle valve control means for controlling the degree of opening of said second variable throttle valve in the dehumidifying mode in accordance with one of a dehumidifying capacity of said cooling heat exchanger and a heating capacity of said heating heat exchanger.

2. The vehicle air conditioning system according to claim 1, wherein
   said refrigerant compressor is a motor-driven refrigerant compressor rotatably driven by a drive motor that is controllably activated by an inverter serving as a drive power supply.

3. The vehicle air conditioning system according to claim 2, wherein
   said cycle efficiency sensing means is a high-pressure sensing means for sensing a high pressure in said refrigeration cycle,
   said cycle efficiency determination means is a first high-pressure determination means, having a first refrigerant temperature sensing means for sensing a temperature of the refrigerant at an outlet of said heating heat exchanger, for calculating a target high pressure providing a maximum cycle efficiency in accordance with the temperature of the refrigerant sensed by said first refrigerant temperature sensing means at the outlet of said heating heat exchanger, and
   in accordance with a pressure deviation between a current high pressure sensed by said high-pressure sensing means and the target high pressure set by said first high-pressure determination means.

4. The vehicle air conditioning system according to claim 2, further comprising:
   capacity overload sensing means for sensing a capacity overload on said heating heat exchanger; and
   said cycle efficiency sensing means is high pressure sensing means for sensing a high pressure in said refrigeration cycle, wherein
   said cycle efficiency determination means is high-pressure determination means, having refrigerant temperature sensing means for sensing a temperature of the refrigerant at an outlet of said external heat exchanger, for calculating a target high pressure providing a maximum cycle efficiency in accordance with the temperature of the refrigerant sensed by said refrigerant temperature sensing means at the outlet of said external heat exchanger, and
   when a capacity overload on said heating heat exchanger is sensed by said capacity overload sensing means and said first throttle valve control means controls the degree of opening of said first variable throttle valve in accordance with a pressure deviation between a current high pressure sensed by said high-pressure sensing means and the target high pressure set by said high-pressure determination means.

5. The vehicle air conditioning system according to claim 4, wherein
   said capacity overload sensing means further comprises:
   heating capacity sensing means for sensing a heating capacity of said heating heat exchanger, heating capacity determination means for calculating a target heating capacity of said heating heat exchanger, and rotational speed sensing means for sensing a rotational speed of said refrigerant compressor, and
   said capacity overload sensing means determines that said heating heat exchanger is overloaded when a deviation between the heating capacity sensed by said heating capacity sensing means and the target heating capacity set by said heating capacity determination means is greater than or equal to a certain value, and when a dehumidifying operation condition is satisfied in which the rotational speed of said refrigerant compressor sensed by said rotational speed sensing means is greater than or equal to a certain value.

6. The vehicle air conditioning system according to claim 2, further comprising:
   blowing temperature determination means for calculating a target blowing temperature of conditioned air blown into the passenger compartment,
   a dehumidifying or defogging switch for requesting dehumidification of a passenger compartment or defogging of a glass window in an ON state, and dehumidifying mode selection means for selecting a dehumidifying mode as an operation mode of said refrigeration cycle when the target blowing temperature set by said blowing temperature determination means is within a predetermined range or when said dehumidifying or defogging switch is in an ON state.

7. The vehicle air conditioning system according to claim 6, wherein
said dehumidifying mode selection means is dehumidifying mode setting means for requesting either a dehumidifying mode of a dehumidifying priority mode or a blowing temperature priority mode, said vehicle air conditioning system further comprising:
dehumidifying capacity sensing means for sensing a dehumidifying capacity of said cooling heat exchanger,
dehumidifying capacity determination means for calculating a target dehumidifying capacity of said cooling heat exchanger,
heating capacity sensing means for sensing a heating capacity of said heating heat exchanger,
heating capacity determination means for calculating a target heating capacity of said heating heat exchanger, and
air conditioning control means for controlling a rotational speed of said refrigerant compressor in accordance with a deviation between a dehumidifying capacity sensed by said dehumidifying capacity sensing means and the target dehumidifying capacity set by said dehumidifying capacity determination means when the dehumidifying priority mode is requested by said dehumidifying mode setting means as well as for controlling the degree of opening of said second variable throttle valve in accordance with a deviation between a heating capacity sensed by said heating capacity sensing means and the target heating capacity set by said heating capacity determination means.

8. The vehicle air conditioning system according to claim 6, wherein
said dehumidifying mode selection means is dehumidifying mode setting means for requesting either a dehumidifying mode of the dehumidifying priority mode or the blowing temperature priority mode, said vehicle air conditioning system further comprising:
dehumidifying capacity sensing means for sensing a dehumidifying capacity of said cooling heat exchanger;
dehumidifying capacity determination means for calculating a target dehumidifying capacity of said cooling heat exchanger;
heating capacity sensing means for sensing a heating capacity of said heating heat exchanger;
heating capacity determination means for calculating a target heating capacity of said heating heat exchanger; and
air conditioning control means for controlling a rotational speed of said refrigerant compressor in accordance with a deviation between a heating capacity sensed by said heating capacity sensing means and the target heating capacity set by said heating capacity determination means when the blowing temperature priority mode is requested by said dehumidifying mode setting means as well as for controlling the degree of opening of said second variable throttle valve in accordance with a deviation between a dehumidifying capacity sensed by said dehumidifying capacity sensing means and the target dehumidifying capacity set by said dehumidifying capacity determination means.

9. The vehicle air conditioning system according to claim 7, further comprising:
a dehumidifying or defogging switch for requesting dehumidification of a passenger compartment or defogging of a glass window in an ON state, and an air conditioner switch for activating said refrigerant compressor in an ON state or when either mode of operation, a cooling mode or a dehumidifying mode, of modes of operation of said refrigeration cycle is requested in an ON state, and
said dehumidifying mode setting means selects said dehumidifying priority mode to provide a higher priority to said dehumidifying priority mode than to said blowing temperature priority mode when said air conditioner switch is in an ON state or when said dehumidifying or defogging switch is in an ON state, or
said dehumidifying mode setting means selects said blowing temperature priority mode to provide a higher priority to said blowing temperature priority mode than to said dehumidifying priority mode when said dehumidifying or defogging switch is in an OFF state and when said air conditioner switch is in an OFF state.

10. The vehicle air conditioning system according to claim 7, further comprising:
blowing temperature determination means for calculating a target blowing temperature of conditioned air blown into the passenger compartment, and operation mode setting means for determining an operation mode of said refrigeration cycle in accordance with the target blowing temperature set by said blowing temperature determination means, wherein
said dehumidifying mode setting means selects said blowing temperature priority mode to provide a higher priority to said blowing temperature priority mode than to said dehumidifying priority mode when said operation mode setting means changes the operation mode of said refrigeration from a heating mode to a dehumidifying mode.

11. The vehicle air conditioning system according to claim 1, wherein
said refrigeration cycle employs carbon dioxide as the refrigerant,
a supercritical vapor compressive heat pump cycle is employed in which the refrigerant is discharged from said refrigerant compressor at a pressure greater than or equal to a critical pressure of the refrigerant.

12. A vehicle air conditioning system comprising:
an air duct for blowing conditioned air into a passenger compartment;
a refrigeration cycle having:
a cooling heat exchanger disposed within said air duct to serve as a heat absorber in a dehumidifying mode;
a heating heat exchanger disposed downstream of said cooling heat exchanger, in a direction of airflow within said air duct, to serve as a heat radiator in the dehumidifying mode;
an external heat exchanger disposed external to said air duct to serve as a heat absorber or a heat radiator in the dehumidifying mode;
a first variable throttle valve connected between said heating heat exchanger and said external heat exchanger, wherein said first variable throttle valve is capable of decompressing a refrigerant introduced from said heating heat exchanger as well as changing the degree of valve opening thereof;
a second variable throttle valve connected between said external heat exchanger and said cooling heat exchanger, wherein said second variable throttle valve is capable of decompressing the refrigerant introduced from said external heat exchanger as well as changing the degree of valve opening thereof; and a dehumidifying mode circulation path for circulating refrigerant discharged from a refrigerant compressor along a path from said heating heat exchanger through said first variable throttle valve, said external heat exchanger, said second variable throttle valve, and said cooling heat exchanger to said refrigerant compressor;

cycle efficiency sensing means for sensing a current cycle efficiency;

cycle efficiency determination means for calculating a target cycle efficiency;

throttle valve control means for controlling the degree of opening of any one of said first variable throttle valve and said second variable throttle valve in the dehumidifying mode in accordance with a deviation between said target cycle efficiency set by said cycle efficiency determination means and said current cycle efficiency sensed by said cycle efficiency sensing means;

capacity overload sensing means for sensing a capacity overload on said heating heat exchanger, wherein said refrigerant compressor is a motor-driven refrigerant compressor rotatably driven by a drive motor that is controllably activated by an inverter serving as a drive power supply, said cycle efficiency sensing means is high-pressure sensing means for sensing a high pressure in said refrigeration cycle, said cycle efficiency determination means is high-pressure determination means, having refrigerant temperature sensing means for sensing a temperature of the refrigerant at an outlet of said external heat exchanger, for calculating a target high pressure providing a maximum cycle efficiency in accordance with the temperature of the refrigerant sensed by said refrigerant temperature sensing means at the outlet of said external heat exchanger, and when a capacity overload on said heating heat exchanger is sensed by said capacity overload sensing means, said throttle valve control means controls the degree of opening of any one of said first variable throttle valve and said second variable throttle valve in accordance with a pressure deviation between a current high pressure sensed by said high-pressure sensing means and the target high pressure set by said high-pressure determination means.

13. The vehicle air conditioning system according to claim 12, wherein said capacity overload sensing means further comprises:

heating capacity sensing means for sensing a heating capacity of said heating heat exchanger, heating capacity determination means for calculating a target heating capacity of said heating heat exchanger, and rotational speed sensing means for sensing a rotational speed of said refrigerant compressor, and said capacity overload sensing means determines that said heating heat exchanger is overloaded when a deviation between the heating capacity sensed by said heating capacity sensing means and the target heating capacity set by said heating capacity determination means is greater than or equal to a certain value, and when a dehumidifying operation condition is satisfied in which the rotational speed of said refrigerant compressor sensed by said rotational speed sensing means is greater than or equal to a certain value.

14. A vehicle air conditioning system comprising:

an air duct for blowing conditioned air into a passenger compartment;

a refrigeration cycle having:

a cooling heat exchanger disposed within said air duct to serve as a heat absorber in a dehumidifying mode;

a heating heat exchanger disposed downstream of said cooling heat exchanger, in a direction of airflow within said air duct, to serve as a heat radiator in the dehumidifying mode;

an external heat exchanger disposed external to said air duct to serve as a heat absorber or a heat radiator in the dehumidifying mode;

a first variable throttle valve connected between said heating heat exchanger and said external heat exchanger, wherein said first variable throttle valve is capable of decompressing a refrigerant introduced from said heating heat exchanger as well as changing the degree of valve opening thereof;

a second variable throttle valve connected between said external heat exchanger and said cooling heat exchanger, wherein said second variable throttle valve is capable of decompressing the refrigerant introduced from said external heat exchanger as well as changing the degree of valve opening thereof; and a dehumidifying mode circulation path for circulating refrigerant discharged from a refrigerant compressor along a path from said heating heat exchanger through said first variable throttle valve, said external heat exchanger, said second variable throttle valve, and said cooling heat exchanger to said refrigerant compressor;

cycle efficiency sensing means for sensing a current cycle efficiency;

cycle efficiency determination means for calculating a target cycle efficiency;

throttle valve control means for controlling the degree of opening of any one of said first variable throttle valve and said second variable throttle valve in the dehumidifying mode in accordance with a deviation between said target cycle efficiency set by said cycle efficiency determination means and said current cycle efficiency sensed by said cycle efficiency sensing means;

blowing temperature determination means for calculating a target blowing temperature of conditioned air blown into the passenger compartment;

a dehumidifying or defogging switch for requesting dehumidification of a passenger compartment or defogging of a glass window in an ON state; and dehumidifying mode selection means for selecting a dehumidifying mode as an operation mode of said refrigeration cycle when the target blowing temperature set by said blowing temperature determination means is within a predetermined range or when said dehumidifying or defogging switch is in an ON state, wherein said refrigerant compressor is a motor-driven refrigerant compressor rotatably driven by a drive motor that is controllably activated by an inverter serving as a drive power supply, said dehumidifying mode selection means is dehumidifying mode setting means for requesting either a dehumidifying mode of a dehumidifying priority mode or a blowing temperature priority mode, and said vehicle air conditioning system further comprises:

dehumidifying capacity sensing means for sensing a dehumidifying capacity of said cooling heat exchanger, dehumidifying capacity determination means for calculating a target dehumidifying capacity of said cooling heat exchanger, heating capacity sensing means for sensing a heating capacity of said heating heat exchanger, heating capacity determination means for calculating a target heating capacity of said heating heat exchanger, and air conditioning control means for controlling a rotational speed of said refrigerant compressor in accordance with a deviation between a dehumidifying capacity sensed by said dehumidifying capacity sensing means and the target dehumidifying capacity set by said dehumidifying capacity determination means when the dehumidifying priority mode is requested by said dehumidifying mode setting means as well as for controlling the degree of opening of any other of said first variable throttle valve and said second variable throttle valve in accordance with a deviation between a heating capacity sensed by said heating capacity sensing means and the target heating capacity set by said heating capacity determination means, or for controlling a rotational speed of said refrigerant compressor in accordance with a deviation between a heating capacity sensed by said heating capacity sensing means and the target heating capacity set by said heating capacity determination means when the blowing temperature priority mode is requested by said dehumidifying mode setting means as well as for controlling the degree of opening of any other of said first variable throttle valve and said second variable throttle valve in accordance with a deviation between a dehumidifying capacity sensed by said dehumidifying capacity sensing means and the target dehumidifying capacity set by said dehumidifying capacity determination means.

15. The vehicle air conditioning system according to claim 14, further comprising:

a dehumidifying or defogging switch for requesting dehumidification of a passenger compartment or defogging of a glass window in an ON state, and an air conditioner switch for activating said refrigerant compressor in an ON state or when either mode of operation, a cooling mode or a dehumidifying mode, of modes of operation of said refrigeration cycle is requested in an ON state, and said dehumidifying mode setting means selects said dehumidifying priority mode to provide a higher priority to said dehumidifying priority mode than to said blowing temperature priority mode when said air conditioner switch is in an ON state or when said dehumidifying or defogging switch is in an ON state, or said dehumidifying mode setting means selects said blowing temperature priority mode to provide a higher priority to said blowing temperature priority mode than to said dehumidifying priority mode when said dehumidifying or defogging switch is in an OFF state and when said air conditioner switch is in an OFF state.

16. The vehicle air conditioning system according to claim 14, further comprising:

blowing temperature determination means for calculating a target blowing temperature of conditioned air blown into the passenger compartment, and operation mode setting means for determining an operation mode of said refrigeration cycle in accordance with the target blowing temperature set by said blowing temperature determination means, wherein said dehumidifying mode setting means selects said blowing temperature priority mode to provide a higher priority to said blowing temperature priority mode than to said dehumidifying priority mode when said operation mode setting means changes the operation mode of said refrigeration cycle from a heating mode to a dehumidifying mode.

* * * * *